United States Patent
Nakatani (10) Patent No.: US 7,448,285 B2
(45) Date of Patent: Nov. 11, 2008

(54) ELECTRIC POWER STEERING SYSTEM

(75) Inventor: Norio Nakatani, Nabari (JP)

(73) Assignee: JTEKT Corporation, Osaka (JP)

( * ) Notice: Subject to any disclaimer, the term of this patent is extended or adjusted under 35 U.S.C. 154(b) by 179 days.

(21) Appl. No.: 10/569,950

(22) PCT Filed: Aug. 27, 2004

(86) PCT No.: PCT/JP2004/012343

§ 371 (c)(1),
(2), (4) Date: Apr. 10, 2006

(87) PCT Pub. No.: WO2005/025967

PCT Pub. Date: Mar. 24, 2005

(65) Prior Publication Data

US 2007/0051189 A1    Mar. 8, 2007

(30) Foreign Application Priority Data

Aug. 28, 2003  (JP) ............................. 2003-305208

(51) Int. Cl.
*G01L 3/04* (2006.01)
*H01R 4/02* (2006.01)
*H01R 13/62* (2006.01)

(52) U.S. Cl. ................... 73/862.321; 439/342; 439/296

(58) Field of Classification Search ................ 180/443, 180/444; 73/862.08, 862.191, 862.321, 862.326, 73/866.1, 431; 439/402, 342, 296
See application file for complete search history.

(56) References Cited

U.S. PATENT DOCUMENTS

| 5,585,573 A | 12/1996 | Satoh et al. |
| 5,586,901 A * | 12/1996 | Muta ........................... 439/342 |
| 5,739,616 A | 4/1998 | Chikaraishi et al. |
| 6,301,975 B1 | 10/2001 | Chikaraishi |

FOREIGN PATENT DOCUMENTS

| JP | 4371/1986 A | 1/1986 |
| JP | 195558/1988 A | 12/1987 |
| JP | 8-5477 A | 1/1996 |
| JP | 8-136365 A | 5/1996 |
| JP | 9-101212 A | 4/1997 |

(Continued)

OTHER PUBLICATIONS

Certified Translation of JP 62-195558.*

*Primary Examiner*—Edward Lefkowitz
*Assistant Examiner*—Punam Patel
(74) *Attorney, Agent, or Firm*—Birch, Stewart, Kolasch & Birch, LLP (57) ABSTRACT

The invention provides an electric power steering system which is adapted to enhance the versatility of a detector coil including lead pins and which may be manufactured at low costs. The electric power steering system PS of the invention has an arrangement wherein lead pins 11 of a detector coil 6 and a control board 30 constituting a control unit 10 are interconnected via a wire harness 13. The lead pin 11 and the wire harness 13 are interconnected via a conductive sleeve terminal 14. The sleeve terminal 14 includes: a cylindrical sleeve portion 40 fitted about the lead pin 11; and a connection portion 41 connected with the wire harness 13 and upstanding from an outside periphery of the sleeve portion 40.

4 Claims, 5 Drawing Sheets

FOREIGN PATENT DOCUMENTS

| | | |
|---|---|---|
| JP | 11-111367 A | 4/1999 |
| JP | 11-248561 A | 9/1999 |
| JP | 2002-240726 A | 8/2002 |
| JP | 2003-11833 A | 1/2003 |
| JP | 2003-227767 A * | 8/2003 |
| JP | 2003-237598 A | 8/2003 |

* cited by examiner

ELECTRIC POWER STEERING SYSTEM

TECHNICAL FIELD

The present invention relates to an electric power steering system which uses a power of an electric motor for assisting a driver in steering operation.

BACKGROUND ART

Conventionally, the electric power steering system has been known which includes: a steering shaft including an input shaft and an output shaft which are coaxially interconnected via a torsion bar; a cylindrical housing for rotatably supporting the steering shaft; a detector coil accommodated in the housing as surrounding the steering shaft in order to detect a torsion angle of the torsion bar; an electric motor for applying a steering assist force to the output shaft or a steering mechanism operatively coupled with the output shaft; a control board for controlling the steering assist force from the electric motor based on the variations of impedance produced in the detector coil; and a plurality of lead pins projecting from an outside periphery of the detector coil.

Such lead pins are inserted through through-holes formed in a substrate constituting the control board and are conductively connected thereto via solder (Japanese Unexamined Patent Publication No. 2003-11833 (FIG. 2)).

DISCLOSURE OF THE INVENTION

As the detector coil for use in the electric power steering system, there are known a pinless-type detector coil wherein wire leads from a coil portion of the detector coil go out of a coil case, and a pin-type detector coil wherein the wire leads from the coil portion are connected to rod-like lead pins, which project from the coil case. The pinless-type detector coil is costly because coil winding and connection between the coil and the wire leads relay on manual operations. On the other hand, the pin-type detector coil can be manufactured at low costs because the coil winding and the connection between the wire lead and the lead pin are automated. Accordingly, the pin-type detector coils are widely used nowadays.

However, the pin-type detector coil is based on the premise that the detector coil is directly connected to the substrate of the control board via the through-holes. Therefore, in a case where the detector coil is connected to the substrate of the control board remote from the detector coil via a wire harness, for example, the detector coil must be connected in a different way from the aforementioned connection method. In an exemplary connection method, a bare wire portion of the wire harness, which is removed of sheathing, is wound about the lead pin and the wound wire portion is soldered to the lead pin. However, this method takes much effort and entails cost increase. Although manufactured at low costs, the pin-type detector coil disadvantageously has poor versatility in terms of relation with the control board to be connected. That is, the pin-type detector coil suffers low versatility.

I view of the foregoing, the invention has an object to provide an electric power steering system which is adapted to enhance the versatility of the detector coil including the lead pins and to achieve cost reduction.

According to the invention, an electric power steering system comprises: a steering shaft including an input shaft and an output shaft which are coaxially interconnected via a torsion bar; a cylindrical housing for rotatably supporting the steering shaft; a detector coil accommodated in the housing as surrounding the steering shaft in order to detect a torsion angle of the torsion bar; an electric motor for applying a steering assist force to the output shaft or a steering mechanism operatively coupled with the output shaft; a control unit for controlling the steering assist force from the electric motor based on the variations of impedance produced in the detector coil; and a plurality of lead pins projected from an outside periphery of the detector coil, the lead pins and a control board constituting the control unit interconnected via a wire harness, and is characterized in that the lead pins and the wire harness are interconnected via conductive sleeve terminals, which each include a cylindrical sleeve portion fitted about the lead pin and a connection portion connected with the wire harness and upstanding from an outside periphery of the sleeve portion.

According to the invention, the connection between the lead pin and the wire harness is readily accomplished because the wire harness is connected with the lead pin by fitting the sleeve terminal connected with the wire harness about the lead pin. Hence, the detector coil including the lead pins may be enhanced in the versatility.

The connection portion may preferably be connected with the sleeve portion in a manner to be spaced away from an end face of the sleeve portion, the end face located on the side of a distal end of the lead pin.

This arrangement is adapted to prevent the wire harness from being dipped in a solder bath when the soldering is performed by dipping the lead pins in the solder bath. Accordingly, protective sheathing of conductive lines constituting the wire harness is prevented from being fused by the heat of the solder bath.

It is further preferred that the sleeve portion is formed with a resilient cut-bent portion at its side, the cut-bent portion bent inwardly.

In this case, the cut-bent portion is resiliently pressed against the inserted lead pin, so that the sleeve terminal fitted about the lead pin may be prevented from readily disengaging therefrom. Hence, the soldering operation is facilitated. Furthermore, the charged solder is allowed to leak through the cut-bent portion during the soldering operation and hence, whether the solder has been assuredly charged in space between the sleeve terminal and the lead pin may be visually determined. Even in the worse case where a defective soldering or solder failure occurs, conduction is ensured by the combination of the lead pin and the cut-bent portion resiliently pressed thereagainst. Therefore, conduction failure between the sleeve terminal and the lead pin may be obviated.

The electric power steering system may preferably include a coupler for integrally fixing the plural sleeve terminals at places aligned with the lead pins.

In this case, an operation of fitting the plural sleeve terminals about the plural lead pins may be accomplished in one step. Therefore, the operation may be increased in efficiency.

The electric power steering system according to the invention is adapted to enhance the versatility of the detector coil including the lead pins and may be manufactured at low costs.

DESCRIPTION OF REFERENCE NUMERALS

PS: Electric Power Steering System
S: Steering Wheel
1: Torsion Bar
2: Input Shaft
3: Output Shaft
4: Steering Shaft
5: Housing
6: Detector Coil
7: Steering Mechanism
8: Electric Motor
10: Control Unit
11: Lead Pin
13: Wire Harness
14: Sleeve Terminal
30: Control Board
40: Sleeve Portion
41: Connection Portion
42: Solder
45: Cut-Bent Portion
46: Coupler

BEST MODES FOR CARRYING OUT THE INVENTION

Preferred embodiments of the invention will hereinbelow be described with reference to the accompanying drawings.

Figure 1:
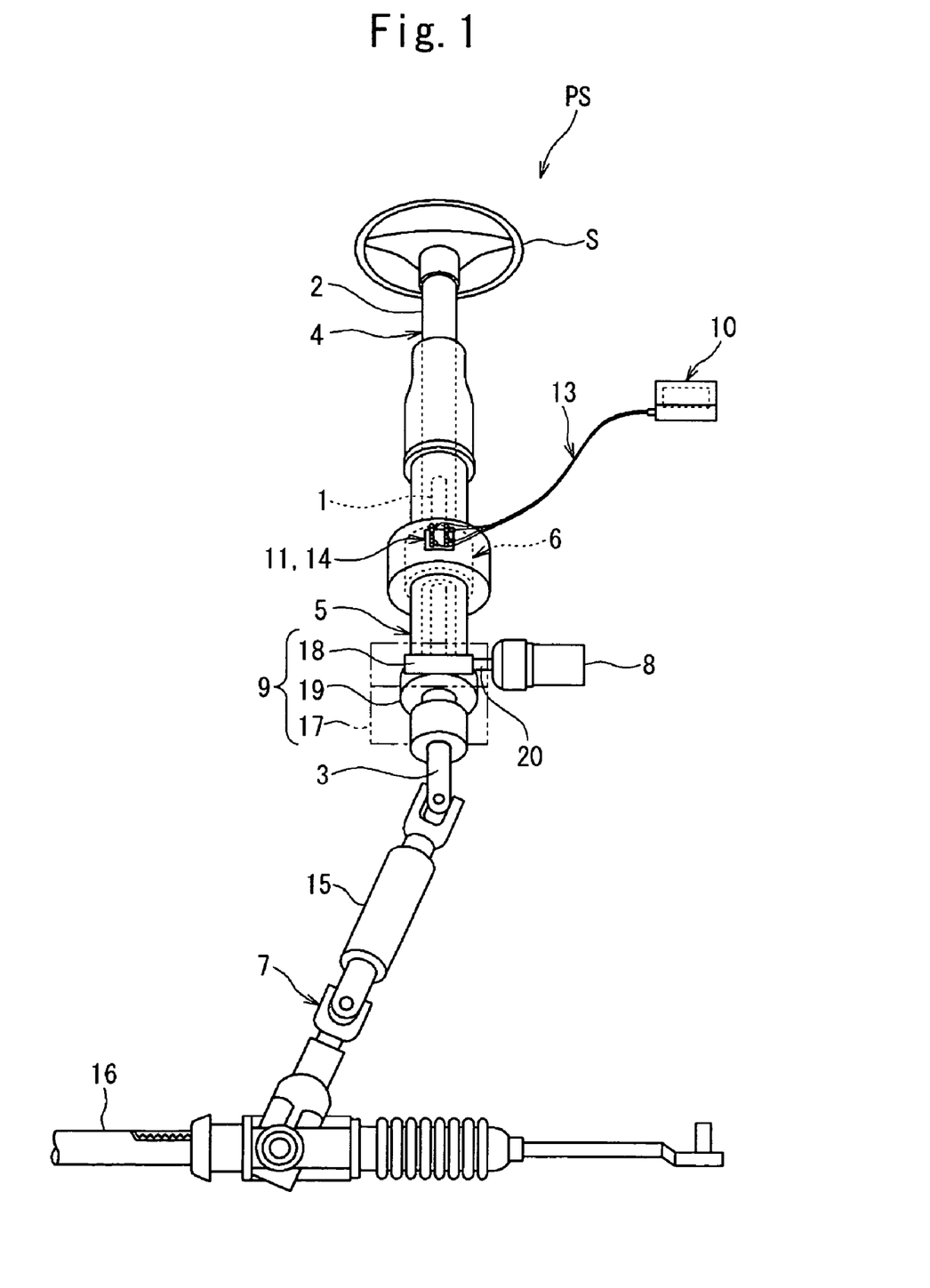
FIG. 1 is a schematic diagram showing a basic arrangement of an electric power steering system according to a first embodiment of the invention.
Figure 2:
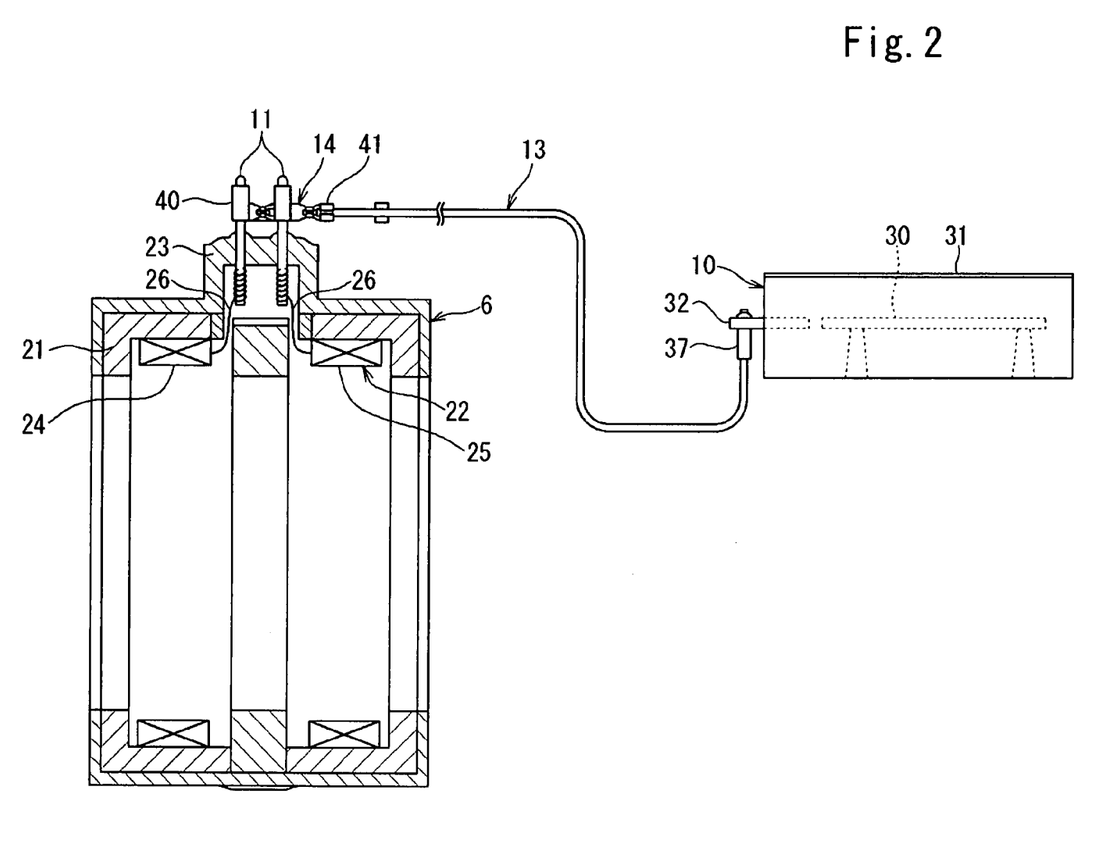
FIG. 2 is a fragmentary front sectional view showing interconnection between a detector coil and a control unit of the electric power steering system according to the first embodiment of the invention.
Figure 3:
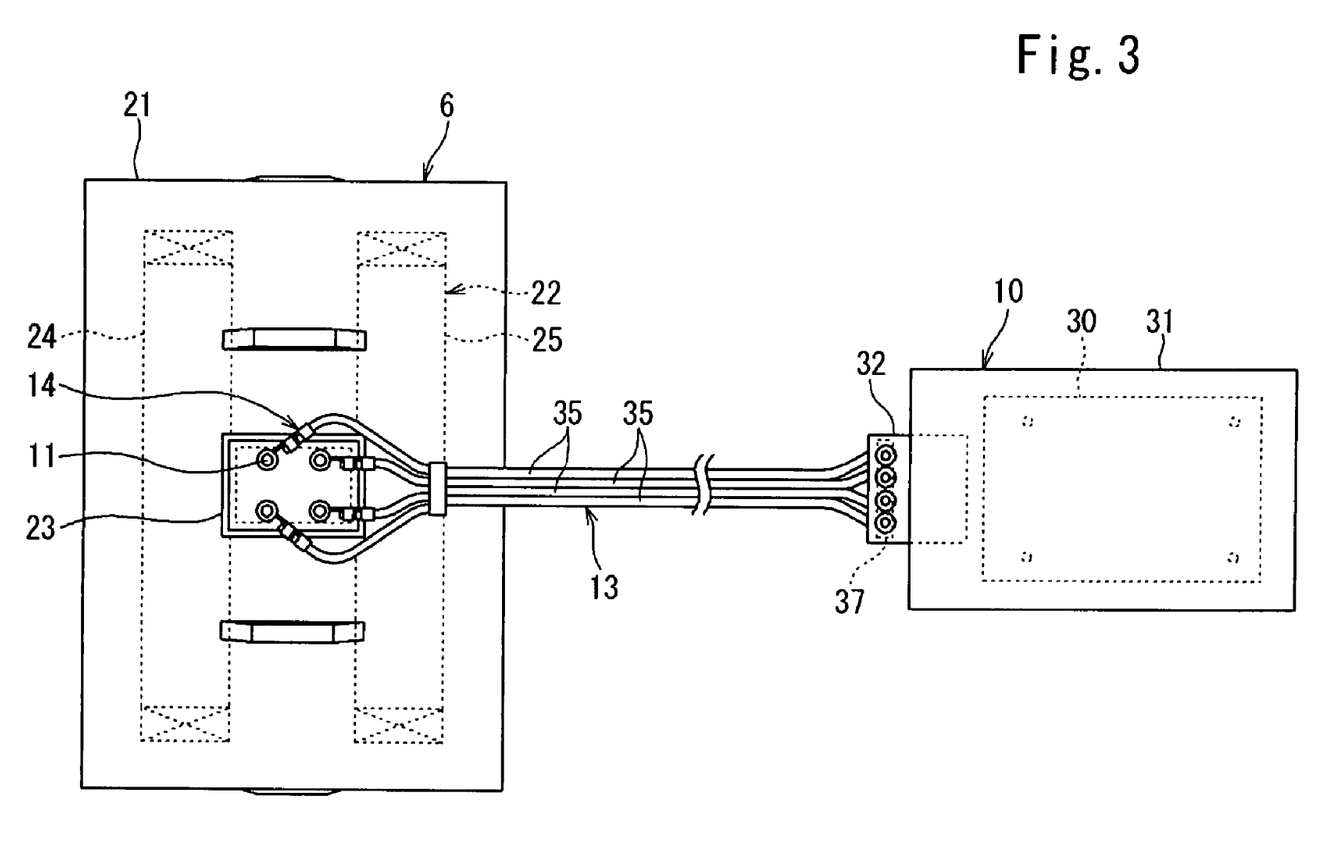
FIG. 3 is a plan view showing the interconnection between the detector coil and the control unit of the electric power steering system according to the first embodiment of the invention.
Figure 4:
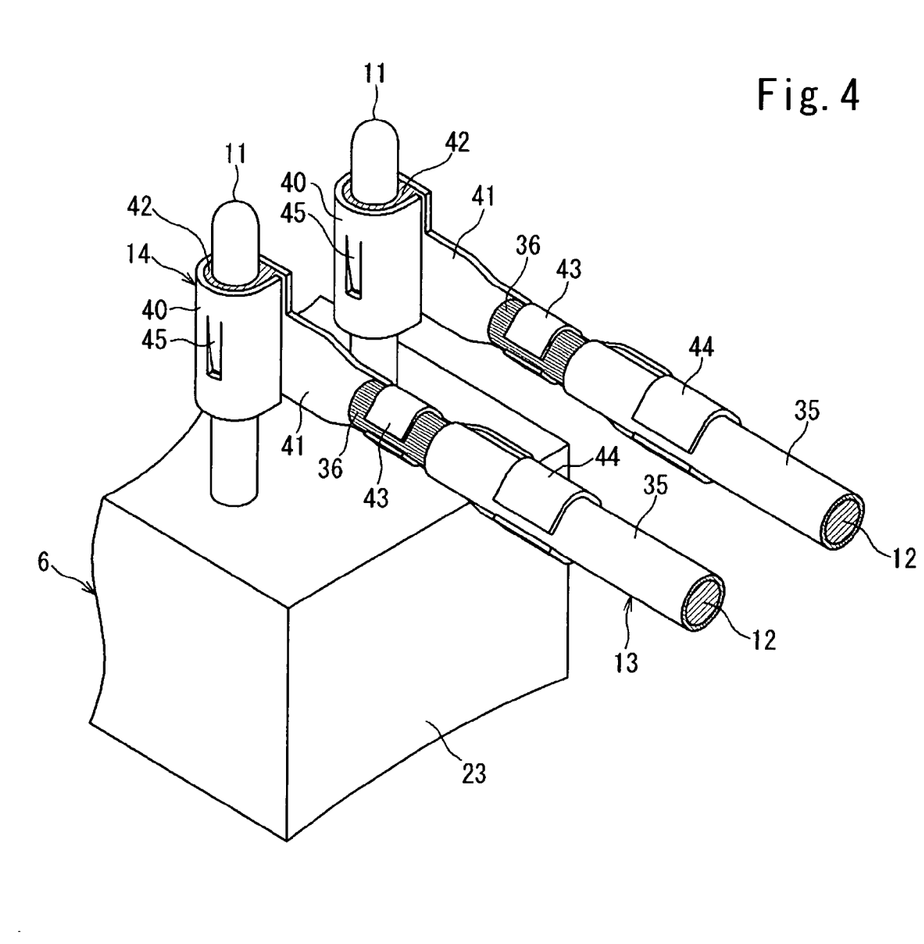
FIG. 4 is a fragmentary perspective view showing interconnection between the detector coil of the electric power steering system according to the first embodiment of the invention and a wire harness.

FIG. 1 schematically shows an electric power steering system PS according to a first embodiment of the invention. FIG. 2 and FIG. 3 show interconnection between a detector coil 6 and a wire harness 13, whereas FIG. 4 shows interconnection between a lead pin 11 and a sleeve terminal 14.

As shown in FIG. 1, the electric power steering system PS includes: a steering shaft 4 including an input shaft 2 and an output shaft 3 which are coaxially interconnected via a torsion bar 1; a steering wheel S connected to an upper end of the input shaft 2; a cylindrical housing 5 rotatably supporting the steering shaft 4; the detector coil 6 accommodated in the housing 5 as surrounding the steering shaft 4 in order to detect a torsion angle of the torsion bar 1; a steering mechanism 7 operatively coupled with the output shaft 3; and an electric motor 8 for applying a steering assist force to the steering shaft 4.

The electric power steering system PS further includes: a gear portion 9 for transmitting the steering assist force from the controlled electric motor 8 to the steering shaft 4; a control unit 10 for controlling the steering assist force from the electric motor 8 based on the variations of impedance produced in the detector coil 6; four lead pins 11 projected from an outside periphery of the detector coil 6; the wire harness 13 bundling four conductive lines 12 interconnecting the control unit 10 and the individual lead pins 11; and four sleeve terminals 14 interposed between the respective lead pins 11 and the respective conductive lines 12.

The steering mechanism 7 includes: an intermediate shaft 15 connected to a lower end of the output shaft 3; and a rack and pinion shaft 16 disposed at a lower end of the intermediate shaft 15 and operative to steer road wheels (not shown).

The gear portion 9 includes: a worm shaft 18 meshed with a worm wheel 19 as accommodated in a gear case 17; and the worm wheel 19 meshed with the worm shaft 18. The worm shaft 18 is fixed to a rotary shaft 20 of the electric motor 8, whereas the worm wheel 19 is coupled with the steering shaft 4.

The detector coil 6 includes: a coil case 21 shaped like a hollow donut and surrounding the steering shaft 4; a coil portion 22 accommodated in the coil case 21; and a terminal block 23 projected from an outside periphery of the coil case 21. The four lead pins 11 are projected from the terminal block 23.

The coil portion 22 includes: a detection coil 24 for detecting a torsion angle of the torsion bar 1; and a temperature compensation coil 25 for compensating for detection error associated with ambient temperature around the detector coil 24. These coils 24, 25 are coaxially arranged in the coil case 21. Two wire leads 26 are extended from each of the coils 24, 25. Thus, a total number of four wire leads 26 are each wound about each of the four lead pins 11 at a portion located within the terminal block 23. Each wound portion of the wire lead is soldered to each lead pin.

The control unit 10 includes: a control board 30 mounted with control circuitry for setting a current value based on the variations of impedance produced in the detector coil 6 and supplying the set current to the electric motor 8; a box 31 accommodating the control board 30; and a connector board 32 disposed at a lateral side of the box 31. The connector board 32 is connected with the control board 30 at its portion accommodated in the box 31. The control board 30 is connected with a battery (not shown) as a power source, so as to supply current to the coil portion 22 of the detector coil 6. The electric motor 8 and the control board 30 are electrically interconnected by means of a wire harness (not shown), so that the controlled current may be supplied to the electric motor 8.

The wire harness 13 includes: a sheathed wire portion 35 including the conductive line 12, an outside periphery of which is covered with a protective sheathing; a bare wire portion 36 defined at one end of the sheathed wire portion 35 by removing a sheathing portion thereat; and a male connector 37 connected to the other end of the sheathed wire portion 35. The bare wire portion 36 is connected to the sleeve terminal 14, whereas the male connector 37 is inserted through a through-hole in the connector board 32 of the control unit 10 and soldered to the connector board. The male connector 37 may also be connected with a female connector disposed at the control unit 10 in place of the connector board 32.

The sleeve terminal 14 has a T-shape as seen in side elevation and includes: a cylindrical sleeve portion 40 fitted about the lead pin 11; and a connection portion 41 in the form of a flat plate upstanding from an outside peripheral surface of the sleeve portion 40 such as to connect with the wire harness 13. According to the embodiment, solder 42 is filled in space between an outside periphery of the lead pin 11 and an inside periphery of the sleeve portion 40, thereby combining these components as ensuring conduction therebetween.

The connection portion 41 is connected with the sleeve portion 40 in a manner to be spaced away from an end face of the sleeve portion 40, the end face located on the side of a distal end of the lead pin 11. The connection portion is formed with first bent pieces 43 and second bent pieces 44 on opposite longitudinal sides thereof, the bent pieces crimped to hold the bare wire portion 36 and the sheathed wire portion 35 of the wire harness 13 against the connection portion 41.

The first bent pieces 43 are bent in a manner to embrace the bare wire portion 36 of the wire harness 13. Similarly, the second bent pieces 44 are also bent in a manner to embrace the sheathed wire portion 35 of the wire harness 13. Thus, the bare wire portion and the sheathed wire portion 35 are pressed against the connection portion 41. The sleeve portion 40 is formed with a cut-bent portion 45 at its side, the cut-bent portion bent inwardly of the sleeve portion for resiliently pressing the inserted lead pin 11 in a radial direction. The cut-bent portion 45 ensures the conduction between the lead pin 11 and the sleeve terminal 14 and also prevents the sleeve terminal 14 from easily disengaging from the lead pin 11.

The connection portion 41 is further formed with a projection (not shown) at place against which the bare wire portion 36 of the wire harness 13 is pressed. The projection is adapted to enhance crimping engagement between the connection portion 41 and the bare wire portion 36, thereby obviating conduction failure. The connection portion 41 is covered with a heat-shrinkable protection tube (not shown) at its portion with which the bare wire portion 36 of the wire harness 13 is connected. Thus, the protection tube prevents shorting caused by contact between the individual sleeve terminals 14.

Now, description is made on a soldering operation for combining the lead pin 11 of the detector coil 6 with the sleeve terminal 14.

The soldering operation is performed in a state where the sleeve terminal 14 is fitted about the lead pin 11. In this state, the distal end of the lead pin 11 is directed downward and dipped in a solder bath (not shown) containing therein a solder fluidized by heating. The lead pin 11 is dipped in such a depth that the end face of the sleeve portion 40 on the side of the distal end of the lead pin may touch a liquid surface of the solder bath, whereas the connection portion 41 of the sleeve terminal 14 may be kept out of contact with the solder bath. When the sleeve portion and the lead pin are dipped in the solder bath, the solder wicks into the space between the inside periphery of the sleeve portion 40 and the outside periphery of the lead pin 11 by capillary action so as to be filled therein. When the solder so charged is fully permeated in the space, a fraction of the solder leaks from the cut-bent portion 45. After confirming the solder leakage, the lead pin is drawn out of the solder bath. When drawn out of the bath, the solder is cooled in the air and solidified. Thus is completed the soldering operation.

The soldering may be accomplished without dipping the wire harness 13 in the solder bath during the soldering operation because the connection portion 41 is connected with the sleeve portion 40 in a manner to be spaced away from the end face of the sleeve portion 40, the end face located on the side of the distal end of the lead pin 11. This provides for an easy soldering operation and also prevents the protective sheathing over the conductive lines 12 from being fused by the heat of the solder bath. Furthermore, the cut-bent portion 45 of the sleeve terminal 14 prevents the sleeve terminal 14 from readily disengaging from the lead pin 11. This also facilitates the soldering operation.

In addition, the arrangement is made such as to allow a fraction of the solder so charged to leak from the cut-bent portion 45. This makes it possible to visually determine that the solder is assuredly filled in the space between the sleeve terminal 14 and the lead pin 11. Therefore, the conduction failure between the sleeve terminal 14 and the lead pin 11 can be obviated. Even in the case of defective soldering or solder failure, the conduction is ensured by the lead pin 11 in combination with the cut-bent portion 45 resiliently pressed thereagainst.

Next, operations of the electric power steering system PS of the above arrangement will be described. The driver operates the steering wheel S thereby producing the steering force in the steer shaft 4. At this time, torsion is produced in the torsion bar 1, a torsion angle of which is detected by the detector coil 6. A detection signal from the detector coil 6 is outputted to the control board 30 mounted with the control circuitry via the lead pins 11, sleeve terminals 14 and wire harness 13. The detection signal is operated by the control circuitry, so that a value of current to be supplied to the electric motor 8 is decided.

The current thus set is supplied to the electric motor 8 from the control board 30. The power of the electric motor 8 driven by supplying the current thereto is applied, as the steering assist force, to the steer shaft 4 via the rotary shaft 20, worm shaft 18 and worm wheel 19. In this manner, the steering assist force according to the magnitude of the steering force applied to the steering wheel S is applied to the steer shaft 4, thereby reducing the load on the driver operating the steering wheel S.

In the electric power steering system PS thus arranged, the sleeve terminal 14 connected with the wire harness 13 is fitted about the lead pin 11 and the sleeve terminal and the lead pin are interconnected by soldering. Therefore, the lead pin 11 and the wire harness 13 may be interconnected easily. That is, the detector coil 6 with the lead pins 11 may be increased in the versatility. Furthermore, the inexpensive detector coil 6 may be used in large quantity so that the electric power steering system PS may be manufactured at low costs.

Figure 5:
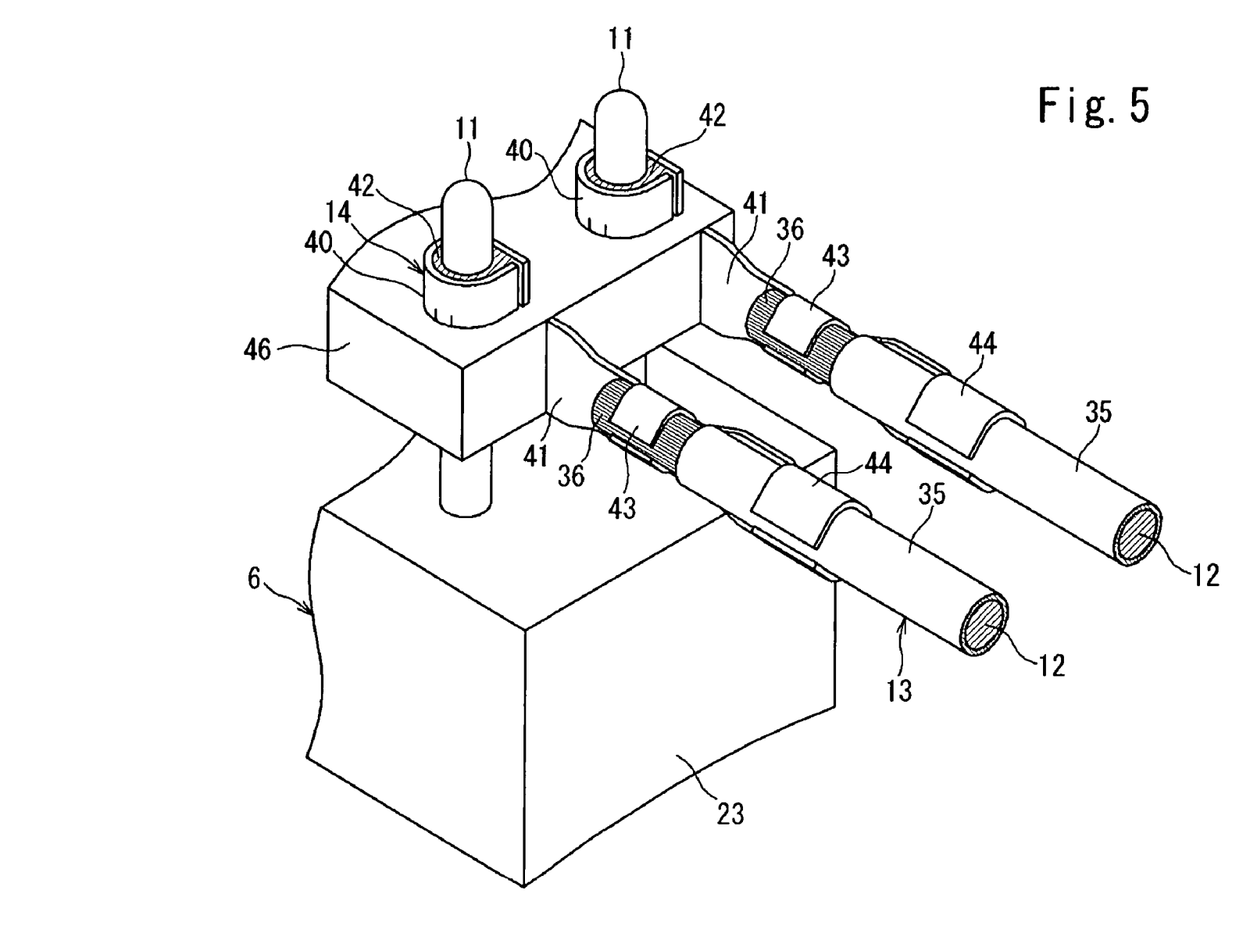
FIG. 5 is a fragmentary perspective view showing interconnection between a detector coil of an electric power steering system according to a second embodiment of the invention and a wire harness.

FIG. 5 shows the sleeve terminals 14 connected to the detector coil 6 of an electric power steering system PS according to a second embodiment of the invention.

The electric power steering system PS is characterized in that the four sleeve terminals 14 are integrally fixed by a coupler 46 such as formed from a resin material. The coupler 46 encloses the respective outside peripheries of the sleeve portions 40 of the sleeve terminals 14 and fixes the sleeve terminals 14 at places aligned with the lead pins 11 of the detector coil 6. According to the sleeve terminals 14 provided with the coupler 46, an operation of fitting the plural sleeve terminals 14 about the plural lead pins 11 may be accomplished in one step. Thus, the operation efficiency may be increased.

It is to be noted that the invention is not limited to the foregoing embodiments.

For instance, the sleeve terminal 14 may also be applied to the detector coil 6 including two lead pins 11. The invention does not limit the number of lead pins 11 to be used. In addition, the coupler 46 of the sleeve terminals 14 may have any configuration or be formed from any material so long as the coupler can fixingly interconnect the individual sleeve portions 40.

What claimed is:

1. An electric power steering system comprising:
   a steering shaft including an input shaft and an output shaft which are coaxially interconnected via a torsion bar;
   a cylindrical housing for rotatably supporting the steering shaft;
   a detector coil accommodated in the housing as surrounding the steering shaft in order to detect a torsion angle of the torsion bar;

an electric motor for applying a steering assist force to the output shaft or a steering mechanism operatively coupled with the output shaft;

a control unit for controlling the steering assist force from the electric motor based on the variations of impedance produced in the detector coil; and a plurality of lead pins projected from an outside periphery of the detector coil, wherein the plurality of lead pins and a control board of the control unit are interconnected via a wire harness, and the plurality of lead pins and the wire harness are interconnected via conductive sleeve terminals, each of the conductive sleeve terminals including a cylindrical sleeve portion fitted about a respective of the plurality of lead pins and a connection portion connected with the wire harness and upstanding from an outside periphery of the sleeve portion, wherein the sleeve portion is formed with a resilient cut-bent portion at a side thereof, the cut-bent portion being bent inwardly, and wherein the sleeve portion is connected to the respective of the plurality of lead pins with solder, the solder being located between an inside surface of the sleeve portion and an outside surface of the respective of the plurality of lead pins.

2. An electric power steering system comprising:

a steering shaft including an input shaft and an output shaft which are coaxially interconnected via a torsion bar;

a cylindrical housing for rotatably supporting the steering shaft;

a detector coil accommodated in the housing as surrounding the steering shaft in order to detect a torsion angle of the torsion bar;

an electric motor for applying a steering assist force to the output shaft or a steering mechanism operatively coupled with the output shaft;

a control unit for controlling the steering assist force from the electric motor based on the variations of impedance produced in the detector coil; and a plurality of lead pins projected from an outside periphery of the detector coil, wherein the plurality of lead pins and a control board of the control unit are interconnected via a wire harness, and the plurality of lead pins and the wire harness are interconnected via conductive sleeve terminals, each of the conductive sleeve terminals including a cylindrical sleeve portion fitted about a respective of the plurality of lead pins and a connection portion connected with the wire harness and upstanding from an outside periphery of the sleeve portion, wherein the sleeve portion is formed with a resilient cut-bent portion at a side thereof, the cut-bent portion being bent inwardly, and wherein the connection portion is connected with the sleeve portion in a manner to be spaced away from an end face of the sleeve portion, the end face being located on a side of a distal end of the respective of the plurality of lead pins, and wherein the sleeve portion is connected to the respective of the plurality of lead pins with solder, the solder being located between an inside surface of the sleeve portion and an outside surface of the respective of the plurality of lead pins.

3. The electric power steering system according to claim 2, further comprising a coupler for integrally fixing the sleeve portions at places aligned with the plurality of lead pins.

4. An electric power steering system comprising:

a steering shaft including an input shaft and an output shaft which are coaxially interconnected via a torsion bar;

a cylindrical housing for rotatably supporting the steering shaft;

a detector coil accommodated in the housing as surrounding the steering shaft in order to detect a torsion angle of the torsion bar;

an electric motor for applying a steering assist force to the output shaft or a steering mechanism operatively coupled with the output shaft;

a control unit for controlling the steering assist force from the electric motor based on the variations of impedance produced in the detector coil; and a plurality of lead pins projected from an outside periphery of the detector coil;

wherein the plurality of lead pins and a control board of the control unit are interconnected via a wire harness, and the plurality of lead pins and the wire harness are interconnected via conductive sleeve terminals, each of the conductive sleeve terminals including a cylindrical sleeve portion fitted about a respective of the plurality of lead pins and a connection portion connected with the wire harness and upstanding from an outside periphery of the sleeve portion, wherein the sleeve portion is formed with a resilient cut-bent portion at a side thereof, the cut-bent portion being bent inwardly, wherein the electric power steering system comprising a coupler for integrally fixing the sleeve portions at places aligned with the plurality of lead pins, and wherein the sleeve portion is connected to the respective of the plurality of lead pins with solder, the solder being located between an inside surface of the sleeve portion and an outside surface of the respective of the plurality of lead pins.

* * * * *